US009685133B2

(12) United States Patent
Zhou et al.

(10) Patent No.: US 9,685,133 B2
(45) Date of Patent: Jun. 20, 2017

(54) STROBE DRIVING CIRCUIT, STROBE DRIVING METHOD, ARRAY SUBSTRATE AND DISPLAY APPARATUS

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Qinggao Zhou, Beijing (CN); Peng Li, Beijing (CN); Zhong Feng, Beijing (CN); Panpan Meng, Beijing (CN); Zuhong Liu, Beijing (CN); Daeoh Oh, Beijing (CN); Zhi Hou, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 10 days.

(21) Appl. No.: 14/589,058

(22) Filed: Jan. 5, 2015

(65) Prior Publication Data

US 2016/0035270 A1 Feb. 4, 2016

(30) Foreign Application Priority Data

Aug. 1, 2014 (CN) .......................... 2014 1 0377572

(51) Int. Cl.
*G06F 5/00* (2006.01)
*G09G 3/36* (2006.01)
*G09G 3/3266* (2016.01)

(52) U.S. Cl.
CPC ......... *G09G 3/3677* (2013.01); *G09G 3/3266* (2013.01); *G09G 2310/0267* (2013.01)

(58) Field of Classification Search
CPC ................. G11C 16/02; G09G 3/2096; G09G 2330/023; G09G 2300/0876; G09G 2300/0819; G09G 2310/08
See application file for complete search history.

(56) References Cited

U.S. PATENT DOCUMENTS 6,731,151 B1 * 5/2004 Doutreloigne ....... G09G 3/3681 326/68
2006/0164350 A1 * 7/2006 Kim ..................... G09G 3/3614 345/87

(Continued)

FOREIGN PATENT DOCUMENTS

JP 2013200933 A * 10/2013 ............. G11C 16/02

*Primary Examiner* — Andrew Sasinowski
*Assistant Examiner* — Gerald Oliver
(74) *Attorney, Agent, or Firm* — Ladas & Parry LLP

(57) ABSTRACT

There are provided with a strobe driving circuit, a strobe driving method, an array substrate and a display apparatus. The strobe driving circuit includes: a first driving unit for receiving a timing control signal, generating a first strobe driving signal based on the power signal under the control of the timing control signal; a first energy storing unit, storing energy based on the first strobe driving signal; a second driving unit connected to the first energy storing unit, for generating a second strobe driving signal based on the energy stored by the first energy storing unit under the control of the timing control signal. In the technical solution according to the embodiments of the application, the number of required bonding pads is reduced, so that the complexity of semiconductor manufacturing process and the difficulty of the manufacturing procedure are reduced.

12 Claims, 7 Drawing Sheets

(56) References Cited

U.S. PATENT DOCUMENTS

| | | | | |
|---|---|---|---|---|
| 2013/0120467 | A1* | 5/2013 | Hou | G09G 3/342<br>345/690 |
| 2013/0328756 | A1* | 12/2013 | Tsuei | G09G 3/3611<br>345/87 |

* cited by examiner

STROBE DRIVING CIRCUIT, STROBE DRIVING METHOD, ARRAY SUBSTRATE AND DISPLAY APPARATUS

This application claims the benefit under 35 U.S.C. §119 (a) of Chinese Patent Application No. 201410377572.1, filed on Aug. 1, 2014, the entire disclosures of which are incorporated herein by references for all purposes.

TECHNICAL FIELD

The present disclosure relates to a field of display technology, especially to a strobe driving circuit, a strobe driving method, an array substrate and a display apparatus.

BACKGROUND ART

Semiconductor device manufacturing procedure includes: front-end process, in which an integrated circuit (IC) chip is formed on a wafer by photolithography process, deposition process and etching process; and back-end process, in which each IC circuit is assembled and packaged. The packaging in the back-end process has four of the following important functions: protecting the chip from being damaged by ambient and operations; forming connections on the chip to input/output signals; supporting the chip physically; and dispersing heat from the chip.

Existing semiconductor device usually includes a plurality of modules, between which signals need to be transmitted. When a second module needs to receive input signal from a first module, a bonding pad is usually set for the second module. That is, the bonding pad should be formed on the chip during the back-end process in semiconductor device manufacturing, so as to transmit signals. However, during the procedure of manufacturing the semiconductor device, a great amount of bonding pads may be needed to transmit signals among different modules. For example, a strobe driving signal and a data signal are needed in a display apparatus including a plurality of display pixels, and a strobe driving device for generating the strobe driving signal also needs input signals, such as power supply. The input signals are received from other circuit modules by a strobe driving device via the bonding pads.

In order to provide a good signal transmission condition, bonding pads with better evenness and less resistance difference are needed, which is particularly important when the number of bonding pads at the input of a module is enormous. However, in the current semiconductor manufacturing process, if a large number of bonding pads with better evenness and less resistance difference are formed, the complexity of semiconductor manufacturing process increases dramatically, and it is difficult to align individual bonding pads with semiconductor devices which receive input signal.

Therefore, during the procedure of semiconductor manufacture, it desires to decrease the complexity of semiconductor manufacturing process, so as to reduce power consumption and material consumption during the manufacturing procedure.

SUMMARY OF THE INVENTION

The disclosure provides a strobe driving circuit, strobe driving method, array substrate and display apparatus, which is able to reduce the complexity of semiconductor manufacturing process and the difficulty of the manufacturing procedure, and further to reduce power consumption and material consumption during the manufacturing procedure.

According to a first aspect of the disclosure, a strobe driving circuit is provided. The strobe driving circuit may include: a first driving unit, having a first control input for receiving a timing control signal, a first power input for receiving a power signal, and a first output connected to a first strobe line, for generating a first strobe driving signal based on the power signal under the control of the timing control signal and outputting the first strobe driving signal to the first strobe line; a first energy storing unit connected to the first output, for storing energy based on the first strobe driving signal; a second driving unit connected to the first energy storing unit, having a second control input for receiving the timing control signal and a second output connected to a second strobe line, for generating a second strobe driving signal based on the energy stored by the first energy storing unit under the control of the timing control signal and outputting the second strobe driving signal to the second strobe line.

Preferably, in the strobe driving circuit, the first energy storing unit may include: a control device, for controlling energy storing and holding of the first energy storing unit; an energy storing component, for storing and holding the energy based on the first strobe driving signal under the control of the control device, and releasing the energy to the second driving unit.

In the strobe driving circuit, the control device may be a triode. The gate of the triode may be connected to the input of the first control input and receive the timing control signal, the drain of the triode may be connected to the first output, and the source of the triode may be connected to the energy storing component.

In the strobe driving circuit, the energy storing component may include: a capacitor, having a first port connected to the control device and a second port connected to the second driving unit, a capacitance value of the capacitor being set based on a cycle of the timing control signal; a resistor, having a first port connected to the control device and a second port connected to the second driving unit, the resistor being connected to the capacitor in parallel.

In the strobe driving circuit, the strobe driving circuit may be a gate driving circuit used for a display, and provides a gate driving signal for a switch element in the pixels of the display with, the first driving unit being a first triode, and the second driving unit being a second triode. A gate of the first triode is connected to the first control input for receiving timing control signal, the drain of the first triode is connected to the first power input for receiving power signal, and the source of the first triode is connected to the first output. The gate of the second triode is connected to the second control input, the source of the second triode is connected to the second output, and the drain of the second triode is connected to the output of the first energy storing unit.

In the strobe driving circuit, it may further include: a 2nd to Nth energy storing units and a 3rd to $N+1^{th}$ driving units, N being a natural number, N≥3 wherein the $n^{th}$ energy storing unit is connected to the $n^{th}$ output, and stores energy based on the $n^{th}$ strobe driving signal, n being a natural number, 2≤n≤N; $n+1^{th}$ driving unit connected to the $n^{th}$ energy storing unit, having a $n+1^{th}$ control input for receiving the timing control signal and a $n+1^{th}$ output connected to the $n+1^{th}$ strobe line, for generating a $n+1^{th}$ strobe driving signal under the control of the timing control signal when the $n^{th}$ energy storing unit releases energy, and for outputting the $n+1^{th}$ strobe driving signal to the $n+1^{th}$ strobe line.

According to a second aspect of the disclosure, there is provided with a strobe driving method used in a strobe driving circuit. The strobe driving circuit may include: a first driving unit, a first energy storing unit connected to a first output of the first driving unit, a second driving unit connected to a output of the first energy storing unit. The first driving unit may have a first control input for receiving a timing control signal, a first power input for receiving a power signal, and a first output connected to a first strobe line. The second driving unit may have a second control input for receiving the timing control signal and a second output connected to a second strobe line. The strobe driving method may include: generating a first strobe driving signal based on the power signal by the first driving unit controlled by the timing control signal, and outputting the first strobe driving signal to the first strobe line; storing energy in the first energy storing unit by means of the first strobe driving signal; generating a second strobe driving signal based on the energy stored by the first energy storing unit by the second driving unit controlled by the timing control signal, and outputting the second strobe driving signal to the second strobe line.

Preferably, in the strobe driving method, the first energy storing unit may include a control device and a energy storing component, said storing energy in the first energy storing unit by means of the first strobe driving signal may include: controlling the control device based on the timing control signal; storing and holding the energy in the energy storing component based on the first strobe driving signal under the control of the control device.

In the strobe driving method, the first driving unit and the second driving unit may be respectively a first triode and a second triode, the timing control signal includes a first duty cycle and a second duty cycle. The first triode may be turned on during the first duty cycle to generate a first strobe driving signal based on the power signal, and the first strobe driving is output to the first strobe line and provided to the first energy storing unit. The first energy storing unit may store energy based on the first strobe driving signal during the first duty cycle, and release the energy during the second duty cycle. The second triode may be turned on during the second duty cycle to generate a second strobe driving signal based on the released energy, and the second strobe driving signal may be output to the second strobe line.

In the strobe driving method, the strobe driving circuit may further include second to $N^{th}$ energy storing units and third to $N+1^{th}$ driving units, the third to $N+1^{th}$ driving units are a third triode to a $(N+1)^{th}$ triode, in which N is a natural number, N≥3. The $n^{th}$ energy storing unit may store energy based on the $n^{th}$ strobe driving signal during the $n^{th}$ duty cycle and release the energy during the $n+1^{th}$ duty cycle, wherein n is a natural number, 2≤n≤N. A $n+1^{th}$ triode is turned on during the $n+1^{th}$ duty cycle, generates a $n+1^{th}$ strobe driving signal based on the energy released by the $n^{th}$ energy storing unit and outputs the $n+1^{th}$ strobe driving signal to the $n+1^{th}$ strobe line.

According to a third aspect of the disclosure, there is provided with an array substrate, including the above-described strobe driving circuit.

According to a forth aspect of the disclosure, there is provided with a display apparatus, including the above-described array substrate.

In the technical solution of the strobe driving circuit, strobe driving method, array substrate and display apparatus according to the disclosure, the input of the second driving unit can be provided based on the output of the first energy storing by means of the first energy storing unit, which reduces the number of the necessary input signals, and reduces the number of bonding pads. Accordingly, the complexity of semiconductor manufacturing process and the difficulty of the manufacturing procedure are reduced, and power consumption and material consumption during the manufacturing procedure are reduced.

DETAILED DESCRIPTION OF THE PREFERRED EMBODIMENTS

Hereinafter, the preferred embodiments will be described by referring to the accompanying drawings. The embodiments to be described are parts of embodiments in this disclosure, not all of the embodiments.

In an traditional strobe driving circuit, when two or more driving signals need to be generated, driving units as many as the driving signals to be generated shall be provided generally. That is, each driving unit needs a corresponding bonding pad to receive signal input.

In the strobe driving circuit according to the embodiment of the disclosure, the strobe driving signal output by the first driving unit is used to generate power input for the driving unit of the next stage. In this way, other driving units except the first driving unit do not need to receive power signals from the outside of the strobe driving circuit, so that corresponding bonding pads for receiving the power signals from the outside of the strobe driving circuit are no longer needed. Thus, bonding pads corresponding to the driving units other than the first driving unit may be omitted, so that the number of the required bonding pads is reduced, and the complexity of semiconductor manufacturing process and the difficulty of the manufacturing procedure are reduced, power consumption and material consumption during the manufacturing procedure are reduced.

Figure 1:
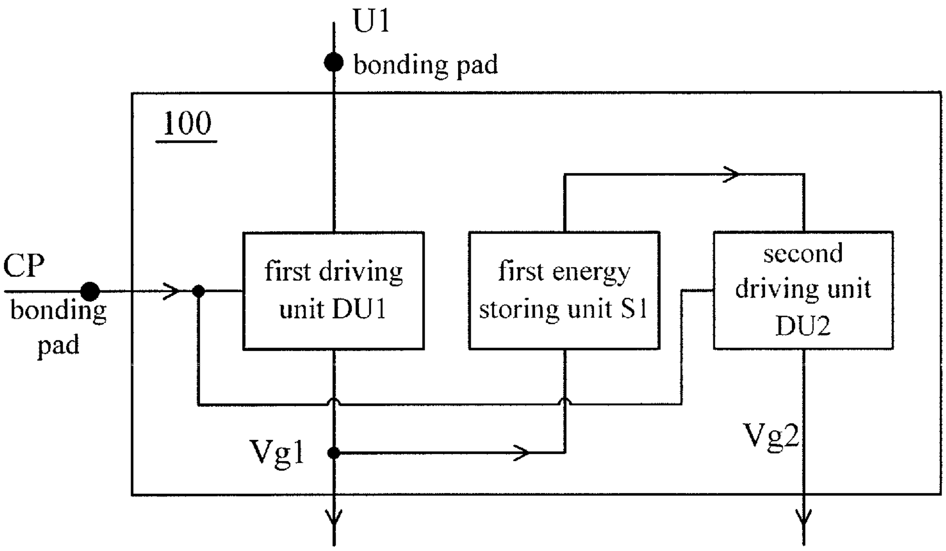
FIG. 1 is a block diagram schematically illustrates a strobe driving circuit according to an embodiment of the disclosure.

FIG. 1 is a block diagram schematically illustrates a strobe driving circuit 100 according to an embodiment of the disclosure. The strobe driving circuit is applicable to various electronic devices. For example, it may be applied to a display to drive a pixel array therein, applied to a voltage source or current source device to generate different driving signals. The specific application of the strobe driving circuit is not limited to the embodiments of the disclosures.

As shown in FIG. 1, the strobe driving circuit 100 may include: a first driving unit DU1, having a first control input for receiving a timing control signal CP, a first power input for receiving power signal U1, and a first output connected to a first strobe line, for generating a first strobe driving signal Vg1 based on the power signal U1 under a control of the timing control signal CP and outputting the first strobe driving signal Vg1 to the first strobe line; a first energy storing unit S1 connected to the first output of the first driving unit DU1, for storing energy based on the first strobe driving signal Vg1; a second driving unit DU2 connected to the first energy storing unit S1, having a second control input for receiving the timing control signal CP and a second output connected to a second strobe line, for generating a second strobe driving signal Vg2 based on the energy stored by the first energy storing unit under the control of the timing control signal CP and outputting the second strobe driving signal Vg2 to the second strobe line.

The first control input of the first driving unit DU1 is used for receiving the timing control signal CP, which is typically a clock pulse, to control work timing of respective driving units, so that the respective driving units cooperate to generate necessary strobe driving signals. The first power input of the first driving unit DU1 is used for receiving the power signal U1, which provides power to the first driving unit DU1 to make it work and output the first strobe driving signal Vg1. The first control input and the first power input of the first driving unit DU1 are typically bonding pads. The bonding pads are aligned with the first driving unit.

The first driving unit DU1 generates the first strobe driving signal Vg1 based on the power signal U1 under the control of the timing control signal CP, and output the first strobe driving signal Vg1 to the first strobe line. The strobe driving circuit may be a gate driving circuit or a base driving circuit for a display. In the case of the strobe driving circuit being gate driving circuit for a display, the first strobe line is connected to a switch element in the pixel of the display, and drives a gate of the switch element by means of the first strobe driving signal Vg1. The first driving unit DU1 may a triode, typically a thin-film transistor. The gate of the thin-film transistor is connected to the first control input for receiving the timing control signal, the drain of the thin-film transistor is connected to the first power input for receiving the power signal, and the source of the thin-film transistor is connected to the first output. When the first driving unit DU1 is a triode, the first strobe driving signal Vg1 may be obtained from the following equation (1):

$$Vg1=\lambda 1U1 \qquad (1)$$

wherein, λ1 is a voltage gain of the triode, and λ1 is a value greater than 0 and less than 1.

The first energy storing unit S1 stores energy based on the first strobe driving signal Vg1 output by the first driving unit DU1, so that the second driving unit is provided with a power signal. As an example, as shown in FIG. 2, the first energy storing unit S1 may include: a control device 210, for controlling energy storage and holding of the first energy storing unit; a energy storing component 220, for storing and holding energy based on the first strobe driving signal Vg1 under the control of the control device 210, and releasing the energy to the second driving unit.

The control device 210 may be for example a diode. An input of the diode is connected to the first output of the first driving unit DU1, an output thereof is connected to the energy storing component 220. The diode is turned on when the first strobe driving signal Vg1 exists, so that energy is stored in the energy storing component 220 by means of the first strobe driving signal Vg1, until the amplitude of the first strobe driving signal drops below a conductive threshold of the diode. The diode is turned off afterwards, and the energy storing component 220 holds the stored energy, which may be then provided to the second driving unit. Alternatively, the control device 210 may be a triode, for example thin-film transistor. The gate of the triode is connected to the first control input and receives the timing control signal, the drain of the triode may be connected to the first output of the first energy storing S1, and the source of the triode may be connected to the energy storing component 220. The triode may control the energy storing and holding of the first energy storing unit under the control of the timing control signal CP.

It will be described in conjunction with FIG. 2 below. FIG. 2 is a circuit structure diagram schematically illustrates a first energy storing unit of the strobe driving circuit in FIG. 1.

Figure 2:
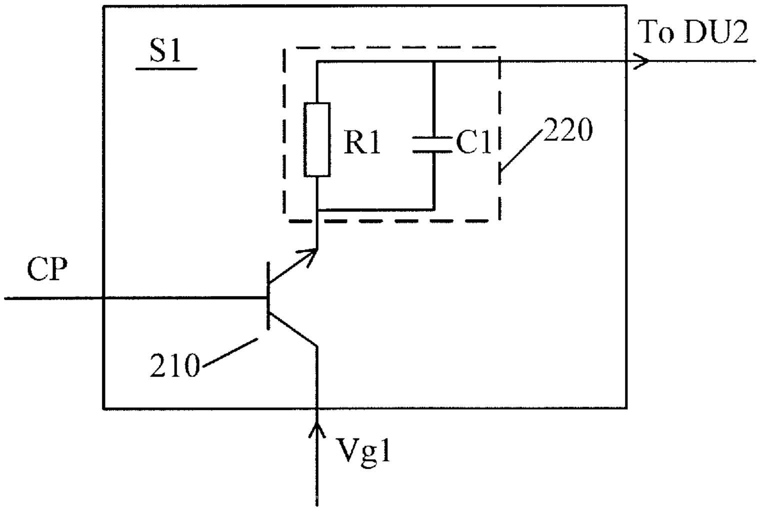
FIG. 2 is a circuit structure diagram schematically illustrates a first energy storing unit of the strobe driving circuit in FIG. 1.

As shown in FIG. 2, the gate of the triode which is the control device 210 receives the timing control signal CP, the drain of the triode is connected to the first output of the first driving unit DU1, and the source of the triode is connected to the energy storing component 220. When timing control signal CP controls the triode to be turned on, the first strobe driving signal Vg1 input to the drain of the triode is provided to the energy storing component, so that energy is stored. When the timing control signal CP controls the triode to be turned off, the energy stored in the energy storing component 220 is held.

In FIG. 2, the energy storing component 220 includes: a capacitor C1, having a first port connected to the control device and a second port connected to the second driving unit, the capacitance value of the capacitor being set based on a cycle of the timing control signal; a resistor R1, having a first port connected to the control device and a second port connected to the second driving unit, the resistor being connected to the capacitor in parallel. The capacitor C1 is charged and stores energy under the control of the first strobe driving signal Vg1. The charging speed of the capacitor depends on its capacitance value. Greater the capacitance value is, faster the charging speed is. Less the capacitance value is, slower the charging speed is. Since the first driving unit DU1 generates the first strobe driving signal Vg1 under the control of the timing control signal CP, the capacitance value of the capacitor C1 needs to be set based on the period of the timing control signal CP in order to make sure that the charging will end within a presence of the first strobe driving signal Vg1. The resistor R1 is used to convert the current flows though the capacitor C1 into a voltage, so that the second drain unit DU2 is provided with a voltage source signal. If the second driving unit DU2 is a device of current driven type, the resistor R1 is not necessary.

The driving unit DU2 is connected to the first energy storing unit S1, and is used for generating a second strobe driving signal Vg2 based on the energy stored in the first energy storing unit S1 under the control of the timing control signal CP, and outputting the second strobe driving signal Vg2 to the second strobe line. Since the second driving unit DU2 generates the second strobe driving signal Vg2 based on the energy stored in the first energy storing unit S1, instead of having an input for receiving the power signal like the first driving unit DU1, a corresponding bonding pad is not necessary. The control input of the second driving unit DU2 may share the same bonding pad with the first control input of the first driving unit DU1 in order to receive the timing control signal CP, without a specific bonding pad. Since the number of the bonding pads is reduced, the complexity of semiconductor manufacturing process and the difficulty of the manufacturing procedure decreases, and power consumption and material consumption during the manufacturing procedure are reduced.

In the case of the strobe driving circuit being the gate driving circuit applied to the display, the second strobe line is connected to a switch element in the pixel of the display, and drives the gate of the switch element by the second strobe driving signal Vg2. The second driving unit DU2 may be a triode, and is typically a thin-film transistor. The gate of the thin-film transistor is connected to the second control input for receiving the timing control signal CP, the drain of the thin-film transistor is connected to the output of the first energy storing unit S1, and the source of the thin-film transistor is connected to the second output which is connected to the second strobe line. When the second driving unit DU2 is a triode, the second strobe driving signal Vg2 may be obtained based on the following equation (1):

$$Vg2=f(\lambda_{S1},\lambda2,c1,r1)Vg1 \quad (2)$$

wherein, Vg1 is the first strobe driving signal output by the first driving unit, λ2 is the voltage gain of the triode used as the second driving unit DU1, $\lambda_{S1}$ is the voltage gain of the triode used as the control device 210, c1 is a capacitance value of the capacitor C1, r1 is a resistance value of the resistor R1, f($\lambda_{S1}$,λ2,c1,r1) is a gain factors dependent on $\lambda_{S1}$, c1, r1

In the case of the strobe driving unit outputting more strobe driving signals, it may further include more energy storing units and more driving units that generate the strobe driving signals based on the energy storing units. As an example, the strobe driving circuit 100 shown in FIG. 1 may further include second to $N^{th}$ energy storing units and third to $N+1^{th}$ driving units, in which N is a natural number, N≥3. The $n^{th}$ energy storing unit is connected to a $n^{th}$ output of a $n^{th}$ energy storing units, and is used for storing energy based on the $n^{th}$ strobe driving signal, wherein n is a natural number, 2≤n≤N. The $n+1^{th}$ driving unit is connected to the $n^{th}$ energy storing unit, has a $n+1^{th}$ control input for receiving the timing control signal and a $n+1^{th}$ output connected to the $n+1^{th}$ strobe line. The $n+1^{th}$ driving unit generates a $n+1^{th}$ strobe driving signal under the control of the timing control signal when the $n^{th}$ energy storing unit releases energy, and outputs the $n+1^{th}$ strobe driving signal to the $n+1^{th}$ strobe line. The $n^{th}$ driving unit does not need an input for receiving the power signal which is different from the first driving unit DU1, and thus a corresponding bonding pad is not necessary. Reduction of the number of the bonding pads decreases the complexity of semiconductor manufacturing process and the difficulty of the manufacture procedure, so that power consumption and material consumption during the manufacturing procedure are reduced.

Alternatively, the strobe driving circuit 100 shown in FIG. 1 may further include M driving units, instead of including other energy storing units except the first energy storing unit, M is a natural number. As the second driving unit, each of the M driving units may generate a strobe driving signal based on the energy stored by the first energy storing unit under the control of the timing control signal, and output the strobe driving signals to corresponding strobe lines. Each of the M driving units needs no bonding pad to receive power signals, so as to decrease the complexity of semiconductor manufacturing process and the difficulty of the manufacturing procedure.

In the technical solution of the strobe driving circuit according to embodiments of the disclosure, the input that is necessary for the second driving unit can be provided by the output of the first driving unit via the first energy storing, which reduces the number of the necessary input signals, and further reduces the number of bonding pads, so that the complexity of semiconductor manufacturing process and the difficulty of the manufacturing procedure are reduced, and power consumption and material consumption during the manufacturing procedure are reduced.

Figure 3:
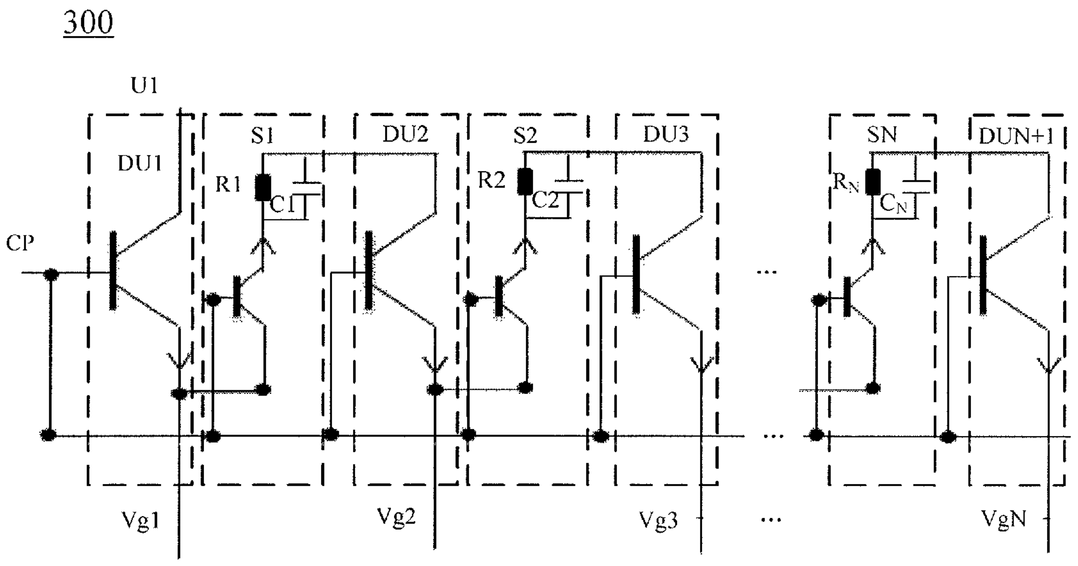
FIG. 3 is a circuit structure diagram schematically illustrates another strobe driving circuit according to an embodiment of the disclosure.

FIG. 3 is a circuit structure diagram schematically illustrates another strobe driving circuit 300 according to an embodiment of the disclosure. The strobe driving circuit 300 shown in FIG. 3 may be used to provide gate driving for a pixel array in a display.

The strobe driving circuit 300 includes a first driving unit DU1 to a $N+1^{th}$ driving unit DUN+1, and a first energy storing unit S1 to a $N^{th}$ energy storing unit SN. The first driving DU1, the first energy storing unit S1 and the second driving unit DU2 in the strobe driving circuit 300 are the same as those in the strobe driving circuit 100 of FIG. 1, and the first and the second driving units are shown as triodes. The first energy storing unit S1 has the structure described above with FIG. 2.

The strobe driving circuit 300 of FIG. 3 is different from the strobe driving circuit 100 of FIG. 1 in that the strobe driving circuit 300 further includes: a second energy storing unit S2, connected to a second output of the second driving unit, for storing energy based on the second strobe driving signal; a third driving unit DU3, connected to the second energy storing unit S2, having a third control input for receiving the timing control signal and a third output connected to a third strobe line, for generating a third strobe driving signal based on the energy stored by the second energy storing unit S2 under the control of the timing control signal and outputting the third strobe driving signal to the third strobe line; . . . a $N^{th}$ energy storing unit SN, connected to a $N^{th}$ output of the $N^{th}$ driving unit, for storing energy based on a $N^{th}$ strobe driving signal output by the $N^{th}$ driving unit; a $N+1^{th}$ driving unit DUN+1, connected to the N energy storing unit SN, having a $N+1^{th}$ control input for receiving the timing control signal and a $N+1^{th}$ output connected to a $N+1^{th}$ strobe line, for generating a $N+1^{th}$ strobe driving signal based on the energy stored by the $N^{th}$ energy storing unit SN under the control of the timing control signal and outputting the $N+1^{th}$ strobe driving signal to the $N+1^{th}$ strobe line, in which N is a natural number greater than or equal to 3.

Each of the second energy storing unit S2 to the $N^{th}$ energy storing unit SN has a structure similar to that of the first energy storing unit S1, and includes transistor, resistor, and capacitor connected in a structure as shown in FIG. 2. Preferably, a capacitance value of the capacitor C2 in the second energy storing unit S2 is less than or equal to that of the capacitor C1 in the first energy storing unit S1, a resistance value of the resistor R2 in the second energy storing unit S2 is less than or equal to that of the resistor R1 in the first energy storing unit S1. Similarly, a capacitance value of the capacitor Cn in the $n^{th}$ energy storing unit Sn is less than or equal to that of the capacitor Cn−1 in the $n-1^{th}$ energy storing unit Sn−1, a resistance value of the resistor Rn in the $n^{th}$ energy storing unit Sn is less than or equal to that of the resistor Rn−1 in the $n-1^{th}$ energy storing unit Sn−1, wherein n is a natural number, and 3≤n≤N. The third driving unit DU3 to the $N^{th}$ driving unit DUN+1 may composed by a triode which is similar to the second driving unit DU2, and may obtain the third to the $N+1^{th}$ strobe driving signals similarly in a manner of the above equation (2).

It may be seen from the diagram of FIG. 3, the strobe driving circuit 300 is used to output N+1 strobe driving signals by only two bonding pads, which are a bonding pad for the timing control signal CP and a bonding pad for the power signal U1. However, in a conventional strobe driving circuit, N+2 bonding pads may be needed, which are a bonding pad for the timing control signal CP, a bonding pad for the power signal U1, a bonding pad for the power signal U2, . . . , a bonding pad for the power signal UN+1. Therefore, in the strobe driving circuit shown in FIG. 3, the number of the bonding pad are decreased, and thus the complexity of semiconductor manufacturing process and the difficulty of the manufacturing procedure are reduced, and power consumption and material consumption during the manufacturing procedure are reduced also.

The strobe driving circuit 300 of FIG. 3 is used to drive the pixel arrays of a display line by line. When the strobe driving signal output by the strobe driving circuit 300 drives a specific line in the pixel arrays, the pixels in the specific line receive data signals and make inversion. Said inversion is, for example, a frame inversion or a line inversion, etc. The frequency of the timing control signal depends on a frequency of the inversion of the pixel electrode in the display. Typically, the frequency of the timing control signal may equal to the frequency of the inversion of the pixel electrode in the display, for example being 50 Hz.

Figure 4:
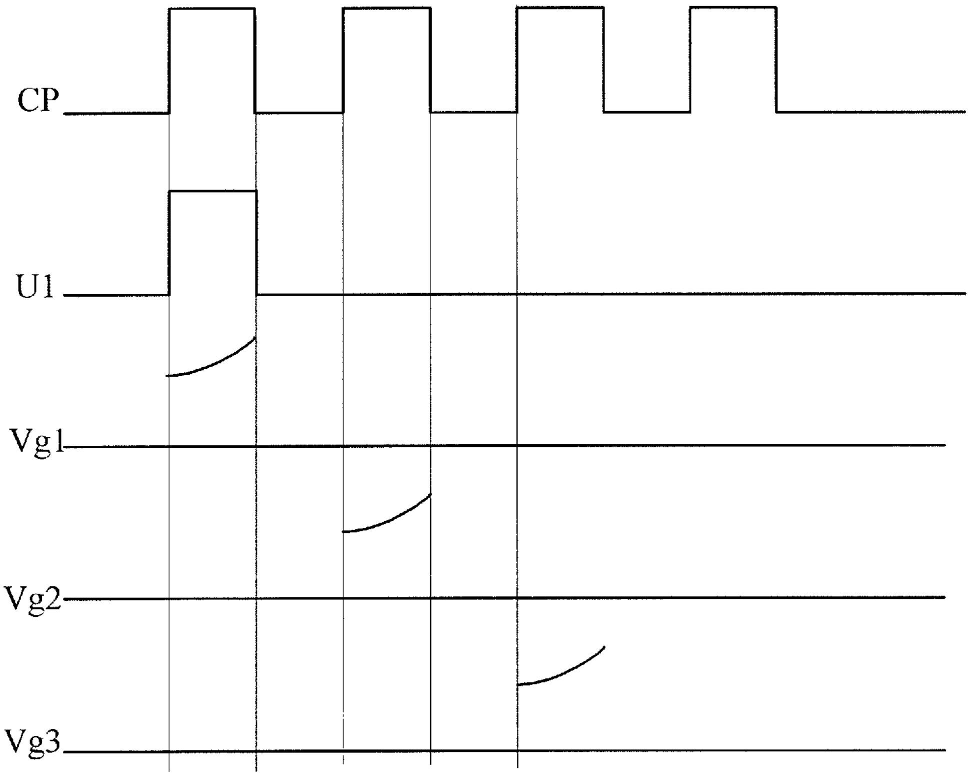
FIG. 4 is a signal timing diagram schematically illustrates a working procedure of the strobe driving circuit in FIG. 3.

FIG. 4 is a signal timing diagram schematically illustrates driving pixel arrays by the strobe driving circuit in FIG. 3. In FIG. 4, signals as follows in the strobe driving circuit 300 are shown sequentially from top to bottom: the timing control signal CP input to the first control input of the first driving unit DU1; the power signal U1 input to the first power input of the first driving unit DU1; the first strobe driving Vg1 output by the first driving unit DU1; the second strobe driving Vg2 output by the second driving unit DU2; the third strobe driving signal Vg3 output by the third driving unit DU3.

As shown in FIG. 4, in a first duty cycle of the timing control signal CP, the timing control signal CP and the power signal U1 are enabled at the same time (for example, both become high level). When the timing control signal CP is high level, the triode in the first driving unit DU1 is turned on in order to output the first strobe driving signal Vg1 in accordance with the above-described equation (1); the triode in the first energy storing unit S1 in FIG. 3 is turned on, and the capacitor C1 charges and stores energy based on the first strobe driving signal. When the timing control signal CP becomes low level during the first duty cycle, the triode in the first driving unit DU1 is turned off, and the triode in the first energy storing unit S1 is turned off, so that the first strobe driving signal Vg1 is no longer output and the energy stored in the first energy storing unit S1 is held. That is, the triode in the first driving unit DU1 is turned on during the first duty cycle to generate the first strobe driving signal based on the power signal, outputs the first strobe driving signal to the first strobe line, and provides it to the first energy storing unit. The first energy storing unit S1 stores the energy based on the first strobe driving signal during the first duty cycle.

During a second duty cycle of the timing control signal CP, the power signal U1 is not input anymore, only the timing control signal CP is enabled. When the timing control signal CP is high level, the triode in the second driving unit DU2 is turned on, and the capacitor C1 of the first energy storing unit S1 in the FIG. 3 discharges, in order to release the energy stored therein. The released energy from the first energy storing unit S1 is used as a driving signal for the second driving unit DU2, and the second strobe driving signal Vg2 may be obtained according to the above-described equation (2). The second strobe driving signal Vg2 is used to charge the capacitor C2 of the second energy storing unit to store energy while being output. When the timing control signal CP becomes low level during the second duty cycle, the triode of the second driving unit DU2 is turned off to stop outputting the second strobe driving signal Vg2, the triode in the second energy storing unit S2 is also turned off and the energy stored in the second energy storing unit S2 is held. That is, the first energy storing unit releases energy during the second duty cycle, and the second triode is turned on during the second duty cycle to generate the second strobe driving signal based on the energy released by the first energy storing unit, and outputs the second strobe driving signal to the second strobe line.

The third duty cycle of the timing control signal CP is similar to the second duty cycle. When the timing control signal CP is high level, the triode in the third driving unit DU3 is turned on, and the capacitor C2 in the second energy storing unit S2 in FIG. 3 discharges to release the energy stored therein. The released energy is used as the driving signal of the third driving unit DU3, and the third driving unit DU3 outputs the third strobe driving signal Vg3. The third strobe driving signal Vg3 is used to charge the capacitor C3 of the third energy storing unit to store energy while being output. When the timing control signal CP become low level during the third duty cycle, the triode of the third driving unit DU3 is turned off to stop outputting the third strobe driving signal Vg3, the triode in the third energy storing unit S3 is also turned off and the energy stored in the third energy storing unit S3 is held. Similarly, other strobe driving signals may be obtained.

The first driving unit DU1 outputs the first strobe driving signal during the first duty cycle. The first energy storing unit S1 stores energy during the first duty cycle and release the energy during the second duty cycle. The second driving unit DU2 outputs the second strobe driving signal during the second duty cycle. The second energy storing unit S2 stores energy during the second duty cycle and release the energy during the third duty cycle. The third driving unit DU3 output the third strobe driving signal during the third duty cycle, and so on.

Figure 5:
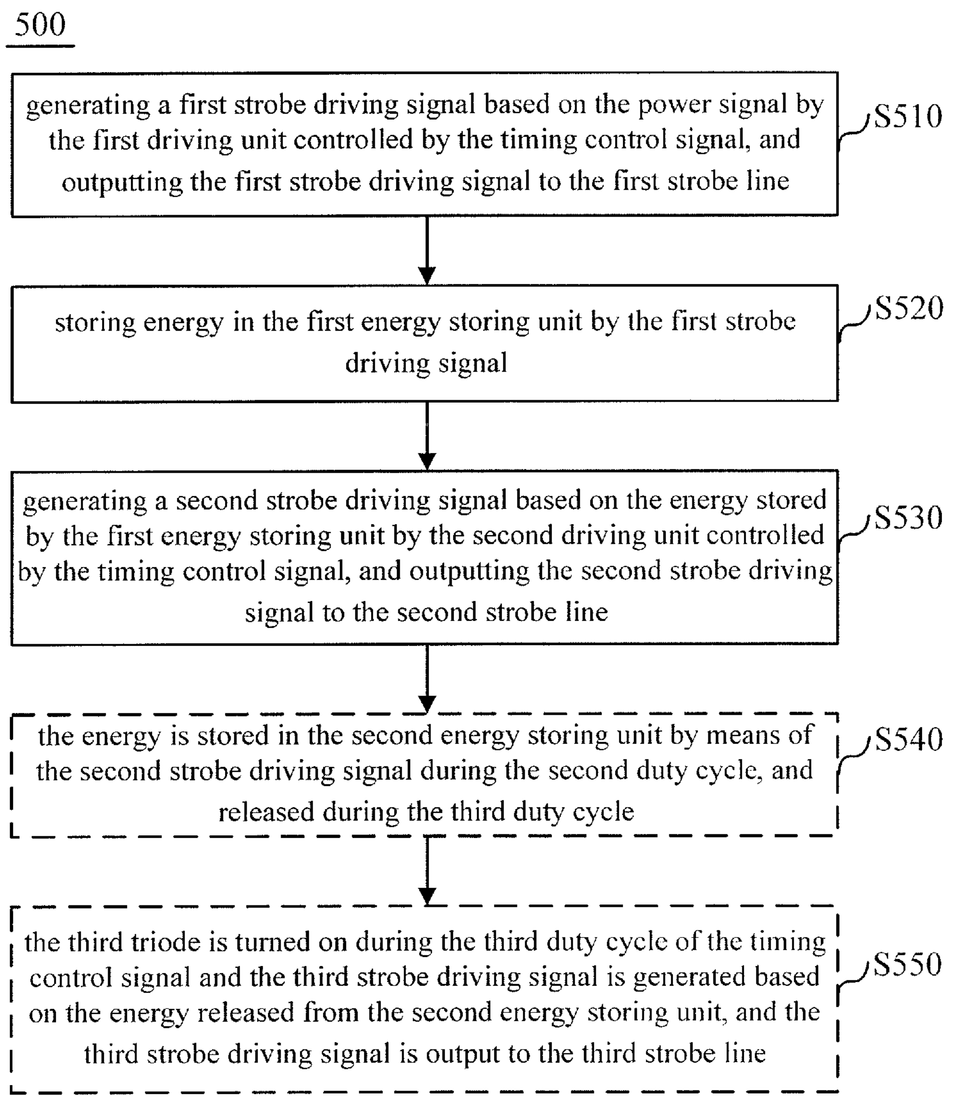
FIG. 5 is a flow chart schematically illustrates a strobe driving method according to an embodiment of the disclosure.

FIG. 5 is a flow chart schematically illustrates a strobe driving method 500 according to an embodiment of the disclosure. The strobe driving method 500 may be applied to various electronic devices. For example, the strobe driving method 500 may be applied to a display to drive pixel arrays therein, and may be applied to a voltage source or current source device to generate different driving signals. The specific application of the strobe driving circuit is not limiting the embodiments of the disclosures.

The strobe driving method 500 is used in the following strobe driving circuits. The strobe driving circuits may include a first driving unit, a first energy storing unit connected to a first output of the first driving unit, a second driving unit connected to a output of the first energy storing unit. The first driving unit has a first control input for receiving a timing control signal, a first power input for receiving power signal, and the first output connected to a first strobe line. The second driving unit has a second control input for receiving the timing control signal and a second output connected to a second strobe line. The structure of the strobe driving circuit may refer to the diagram of FIG. 1 and related description.

As shown in FIG. 5, the strobe driving method 500 may include: generating a first strobe driving signal based on the power signal by the first driving unit controlled by the timing control signal, and outputting the first strobe driving signal to the first strobe line (S510); storing energy in the first energy storing unit by means of the first strobe driving signal (S520); generating a second strobe driving signal based on the energy stored by the first energy storing unit by the second driving unit controlled by the timing control signal, and outputting the second strobe driving signal to the second strobe line (S530).

In S510, the first strobe driving signal is generated based on the timing control signal and the power signal. The first driving unit receives the timing control signal and the power signal from other circuits or modules, so that two bonding pads are necessary. In the case of the strobe driving circuit being a gate driving circuit applied to the display, the first strobe line is connected to a switch element in the pixel of the display, and drives a gate of the switch element by the first strobe driving signal. The first driving unit may be a triode, and is typically a thin-film transistor. The gate of the thin-film transistor is connected to the first control input, the drain of the thin-film transistor is connected to the first power input, and the source of the thin-film transistor is connected to the first output. The relationship between the power signal and the first strobe driving signal may refer to the above-described equation (1).

In S520, energy is stored in the first energy storing unit by means of the first strobe driving signal. The stored energy provides power signal to the second driving unit. The energy storing unit for example may include a control device and an energy storing component. The control device may a diode or a triode, the energy storing component may be a capacitive device, the detailed structure of the device and component may refer to the diagram of FIG. 2 and related description. In the case of the control device being a triode, the S510 may include: controlling the control device based on the timing control signal; storing and holding energy in the energy storing component based on the first strobe driving signal under the control of the control device. When the control device is a diode, it is not necessary to operate based on the control of the timing control signal.

In S530, the second driving unit is controlled by the timing control signal to generate a second strobe driving signal based on the energy stored in the first energy storing unit, and the second strobe driving signal is output to a second strobe line. That is, the second strobe driving signal is generated based on the energy stored by the first energy storing unit without having a input for receiving the power signal, and thus corresponding bonding pad is not necessary. The timing control signal may be shared by respective units inside of the strobe driving circuit, without setting a plurality of inputs to receive timing control signals for the strobe driving circuit. In the case of the strobe driving circuit being a gate driving circuit used for a display, the second strobe driving signal is transmitted to the element of the pixels in the display via the second strobe line, to drive the gate of the switch element. The second driving unit may a triode, for example a thin-film transistor. The relationship between the second strobe driving signal Vg2 and the first strobe driving signal Vg1 may refer to the above-described equation (2).

In a case that the strobe driving unit needs more strobe driving signals, it may further include more energy storing units and driving units that generate strobe driving signals based on output of the energy storing units, as shown in FIG. 3. As an example, the strobe driving circuit may further include a second to $N^{th}$ energy storing units and a third to $N+1^{th}$ driving units. The third to $N+1^{th}$ driving units may be a third triode to a $N+1^{th}$ triode, respectively, in which N is a natural number, N≥3. The strobe driving method may further include: storing by the $n^{th}$ energy storing unit energy based on the $n^{th}$ strobe driving signal during the $n^{th}$ duty cycle, and releasing the energy during the $n+1^{th}$ duty cycle, wherein n is a natural number, 2≤n≤N, turning on the $n+1^{th}$ triode being during the $n+1^{th}$ duty cycle and generating the $n+1^{th}$ strobe driving signal based on the energy released from the $n^{th}$ energy storing unit, and outputting the $n+1^{th}$ strobe driving signal to the $n+1^{th}$ strobe line. In FIG. 5, as shown by dashed lines in FIG. 5, it shows the energy is stored in the second energy storing unit by means of the second strobe driving signal during the second duty cycle, and released during the third duty cycle (S540), and the third triode is turned on during the third duty cycle of the timing control signal and the third strobe driving signal is generated based on the energy released from the second energy storing unit, and the third strobe driving signal is output to the third strobe scanning line (S550). The strobe driving circuit may further include more energy storing units and driving units in practice. The third to the $N+1^{th}$ driving units do not have the power input for receiving power signal, which is different from the first driving unit, and thus corresponding bonding pads are not necessary. Reduction of the number of the bonding pads decreases the complexity of semiconductor manufacturing process and the difficulty of the manufacturing procedure, power consumption and material consumption during the manufacturing procedure are further reduced.

The strobe driving circuit may further include M driving circuits, and does not include other energy storing units except the first energy storing unit, M is a natural number. Each of the M driving units may generate strobe driving signals based on the energy stored by the first energy storing unit under the control of the timing control signal, and output the strobe driving signals to corresponding strobe lines. Each of the M driving units needs no bonding pad to receive power signals from outside of the strobe driving circuit, and thus the complexity of semiconductor manufacturing process and the difficulty of the manufacturing procedure are decreased.

In the case of the strobe driving circuit being a gate driving circuit applied to a display, the work timing of the strobe driving method may refer to the descriptions in conjunction with FIG. 4. In short, in S510, the first driving unit is enabled to generate the first strobe driving signal based on the power signal during the first duty cycle of the timing control signal; in S520, the energy is stored in the first energy storing unit based on the first strobe driving signal during the first duty cycle, the stored energy being released during the second duty cycle of the timing control signal; in S530, the second driving unit is enabled to generate the second strobe driving signal based on the energy released by the first energy storing unit during the second duty cycle. More strobe driving signals may be output in a similar manner. The frequency of the timing control signal may depend on the frequency of the inversion of the pixel electrode in the display. For example, the frequency of the timing control signal equals to the frequency of the inversion.

In the technical solution of the strobe driving method according to the embodiments of the disclosure, an output of a previous driving unit can be used for providing the input for a latter driving unit by means of the first energy storing unit, which reduces the number of the required input signals. Accordingly, the number of the required bonding pads is reduced. Therefore, the complexity of semiconductor manufacturing process and the difficulty of the manufacturing procedure are reduced, and power consumption and material consumption during the manufacturing procedure are further reduced.

Figure 6:
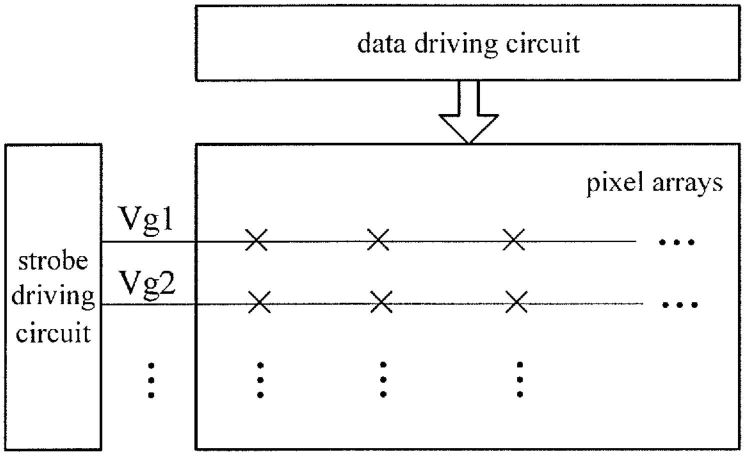
FIG. 6 is a block diagram schematically illustrates an array substrate according to an embodiment of the disclosure.

As described above, the strobe driving circuit according to the embodiments of the disclosure may be applied to various devices or modules. FIG. 6 is a diagram block schematically illustrates an array substrate according to an embodiment of the disclosure.

As shown in FIG. 6, the array substrate may include: pixel arrays; the strobe driving circuit according to the embodiments of the disclosure, for generating strobe driving signals respectively corresponding to various lines of pixels; a data driving circuit, for providing the strobe various lines of pixels with data. When the strobe driving signal output by the strobe driving circuit selects a particular line in the pixel arrays, the pixels of the particular line are enabled, so that data signals may be received from the data driving circuit and inversion can be made. Inversion is for example a frame inversion or a line inversion, etc. The frequency of the timing control signal may equal to the frequency of the inversion of the pixel electrode in the display. FIG. 6 is merely an exemplary structure of the array substrate, which may further include other components, such as a substrate, an isolation layer. Those skilled in the art may design an appropriate array substrate including the strobe driving circuit according to embodiments of the disclosure, as required.

Figure 7:
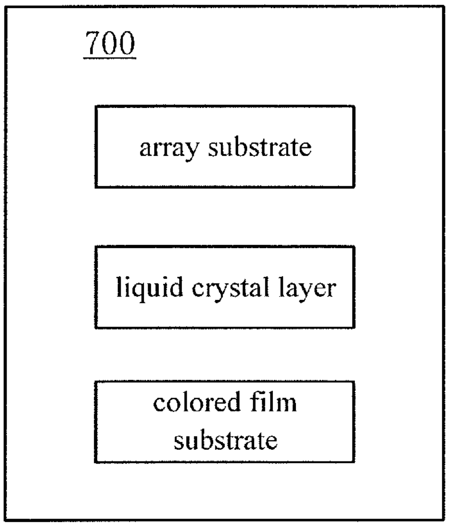
FIG. 7 is a block diagram schematically illustrates a display apparatus according to an embodiment of the disclosure.

FIG. 7 is a block diagram schematically illustrates a display apparatus 700 according to an embodiment of the disclosure. The display apparatus may be, for example, a thin-film transistor liquid crystal display (TFT LCD), an active matrix organic light emitting diode display (AMOLED), a twisted nematic (TN) or wide angle widescreen LCD display, etc. Taking the thin-film transistor liquid crystal display as an example, the display apparatus may include: the above-described array substrate; an colored film substrate aligned with the array substrate; an liquid crystal layer, located between the array substrate and the colored film substrate. Besides, the display apparatus may further include backlight unit for generating back light. In the technical solution of the array substrate and the display apparatus according to the disclosure, since there has been adopted the above-described strobe driving circuit, in which an output of a previous driving unit is used for providing the input of a latter driving unit, the number of the required input signals is reduced, which correspondingly reduces the number of the required bonding pads. Therefore, the complexity of semiconductor manufacturing process and the difficulty of the manufacturing procedure are reduced, and power consumption and material consumption during the manufacturing procedure are reduced.

Those skilled in the art should learn clearly that, for convince and clarity, the implementation and structure of the driving device, to which the above-described strobe driving method is applied to, may refer to the diagrams and operations in the embodiments of the strobe driving device described in conjunction with FIG. 1 to FIG. 4. The description will be omitted.

In the embodiments provided by the disclosure, it should be understood that, the disclosed device and method may be implemented by other manners. For example, the embodiments of the device described above are merely illustrative, parts of the steps in the embodiments of the method may be recombined.

The descriptions above are merely implementations of the invention and the scope of the invention is not limited thereto. Within the technical scope of the invention, those skilled in the art may easily conceive modifications or alternatives, all fall in the scope of the invention. Thus, the scope of the invention should be limited by the following claims.

What is claimed is:

1. A strobe driving circuit, comprising:

a first driving unit, having only one first control input for receiving only one timing control signal, only one first power input for receiving a power signal, and only one first output connected to a first strobe line, for generating only one first strobe driving signal based on the power signal under the control of the timing control signal and outputting the first strobe driving signal to the first strobe line;

a first energy storing unit connected to the only one first output, for storing energy based on the only one first strobe driving signal;

a second driving unit, having only one second power input connected to an output of the first energy storing unit for directly receiving energy from the first energy storing unit without the power signal, having only one second control input for directly receiving the timing control signal and only one second output connected to a second strobe line, for generating only one second strobe driving signal based on the energy received from the first energy storing unit under the control of the timing control signal and outputting the second strobe driving signal to the second strobe line.

2. The strobe driving circuit of claim 1, wherein, the first energy storing unit includes:

a control device, for controlling energy storing and holding of the first energy storing unit;

an energy storing component, for storing and holding the energy based on the first strobe driving signal under the control of the control device, and releasing the energy to the second driving unit.

3. The strobe driving circuit of claim 2, wherein, the energy storing component includes:

a capacitor, having a first port connected to the control device and a second port connected to the second driving unit, a capacitance value of the capacitor being set based on a cycle of the timing control signal;

a resistor, having a first port connected to the control device and a second port connected to the second driving unit, the resistor being connected to the capacitor in parallel.

4. The strobe driving circuit of claim 1, wherein, the control device is a triode, a gate of the triode being connected to the first control input and receiving the timing control signal, the drain of the triode being connected to the first output, and the source of the triode being connected to the energy storing component.

5. The strobe driving circuit of claim 1, wherein, the strobe driving circuit is a gate driving circuit applies to a display, provides a gate driving signal for a switch element in the pixels of the display, the first driving unit being a first triode, and the second driving unit being a second triode, wherein a gate of the first triode is connected to the first control input for receiving timing control signal, the drain of the first triode is connected to the first power input for receiving power signal, and the source of the first triode is connected to the first output, a gate of the second triode is connected to the second control input, the source of the second triode is connected to the second output, and the drain of the second triode is connected to the output of the first energy storing unit.

6. The strobe driving circuit of claim 1, further including: a 2nd to Nth energy storing units and a 3rd to N+1$^{th}$ driving units, N being a natural number, N≥3, wherein the n$^{th}$ energy storing unit is connected to the n$^{th}$ output, and stores energy based on the n$^{th}$ strobe driving signal, n being a natural number, 2≤n≤N;

a n+1$^{th}$ driving unit connected to the n$^{th}$ energy storing unit, having a n+1 $^{th}$ control input for receiving the timing control signal and a n+1$^{th}$ output connected to the n+1$^{th}$ strobe line, for generating a n+1$^{th}$ strobe driving signal under the control of the timing control signal when the nth energy storing unit releases energy, and for outputting the n+1$^{th}$ strobe driving signal to the n+1$^{th}$ strobe line.

7. An array substrate, comprising the strobe driving circuit according to claim 1.

8. A display apparatus, comprising the array substrate of claim 7.

9. A strobe driving method used in a strobe driving circuit, the strobe driving circuit including a first driving unit, a first energy storing unit connected to a first output of the first driving unit, a second driving unit connected to a output of the first energy storing unit, the first driving unit having only one first control input for receiving a timing control signal, only one first power input for receiving a power signal, and only one first output connected to a first strobe line, the second driving unit having only one second power input connected to the output of the first energy storing unit for directly receiving energy from the first energy storing unit without the power signal, having only one second control input for directly receiving the timing control signal and only one second output connected to a second strobe line, the strobe driving method includes:

generating a first strobe driving signal based on the power signal by the first driving unit controlled by the timing control signal, and outputting the first strobe driving signal to the first strobe line;

storing energy in the first energy storing unit by means of the first strobe driving signal;

generating a second strobe driving signal based on the energy received from the first energy storing unit by the second driving unit controlled by the timing control signal, and outputting the second strobe driving signal to the second strobe line.

10. The strobe driving method of claim 9, wherein, the first energy storing unit includes a control device and an energy storing component, said storing energy in the first energy storing unit by means of the first strobe driving signal includes:

controlling the control device based on the timing control signal;

storing and holding the energy in the energy storing component based on the first strobe driving signal under the control of the control device.

11. The strobe driving method of claim 9, wherein, the first driving unit and the second driving unit are respectively a first triode and a second triode, the timing control signal includes a first duty cycle and a second duty cycle, the first triode is turned on during the first duty cycle to generate a first strobe driving signal based on the power signal, and the first strobe driving is output to the first strobe line and provided to the first energy storing unit;

the first energy storing unit stores energy based on the first strobe driving signal during the first duty cycle, and releases the energy during the second duty cycle;

the second triode is turned on during the second duty cycle to generate a second strobe driving signal based on the released energy, and the second strobe driving is output to the second strobe line.

12. The strobe driving method of claim 9, wherein, the strobe driving circuit further includes second to N$^{th}$ energy storing units and third to N+1$^{th}$ driving units, the third to N+1$^{th}$ driving units are a third triode to a N+1$^{th}$ triode respectively, in which N is a natural number, N≥3, the n$^{th}$ energy storing unit stores energy based on the n$^{th}$ strobe driving signal during the n$^{th}$ duty cycle and release the energy during the n+1$^{th}$ duty cycle, n being a natural number, 2≤n≤N;

a n+1$^{th}$ triode is turned on during the n+1$^{th}$ duty cycle and generates a n+1$^{th}$ strobe driving signal based on the energy released by the n$^{th}$ energy storing unit, and outputs the n+1$^{th}$ strobe driving signal to the n+1$^{th}$ strobe line.

* * * * *